United States Patent
Kang et al.

(10) Patent No.: US 11,334,183 B2
(45) Date of Patent: May 17, 2022

(54) ELECTRONIC DEVICE FOR SUPPORTING USER INPUT AND CONTROL METHOD OF ELECTRONIC DEVICE

(71) Applicant: Samsung Electronics Co., Ltd., Gyeonggi-do (KR)

(72) Inventors: Donghoon Kang, Gyeonggi-do (KR); Jikwang Kang, Gyeonggi-do (KR); Kyuhong Kim, Gyeonggi-do (KR); Sangmin Shin, Gyeonggi-do (KR); Yeojeong Yoon, Gyeonggi-do (KR); Yusun Cheong, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/260,306

(22) PCT Filed: Jul. 26, 2019

(86) PCT No.: PCT/KR2019/009319
§ 371 (c)(1),
(2) Date: Jan. 14, 2021

(87) PCT Pub. No.: WO2020/022829
PCT Pub. Date: Jan. 30, 2020

(65) Prior Publication Data
US 2021/0286495 A1    Sep. 16, 2021

(30) Foreign Application Priority Data

Jul. 26, 2018  (KR) ........................ 10-2018-0087028

(51) Int. Cl.
*G06F 3/041* (2006.01)
*G06F 3/0354* (2013.01)
*G06F 3/038* (2013.01)

(52) U.S. Cl.
CPC ........ *G06F 3/04162* (2019.05); *G06F 3/0383* (2013.01); *G06F 3/03545* (2013.01); *G06F 2203/0384* (2013.01)

(58) Field of Classification Search
CPC ............ G06F 3/04162; G06F 3/03545; G06F 3/0383; G06F 2203/0384; G06F 3/0354; G06F 3/038; G06F 3/041
See application file for complete search history.

(56) References Cited

U.S. PATENT DOCUMENTS

| | | | |
|---|---|---|---|
| 2013/0082937 A1* | 4/2013 | Liu | G06F 3/03545 345/173 |
| 2014/0055426 A1 | 2/2014 | Park et al. | |

(Continued)

FOREIGN PATENT DOCUMENTS

| | | |
|---|---|---|
| JP | 2008-040688 A | 2/2008 |
| JP | 2010-097349 A | 4/2010 |

(Continued)

*Primary Examiner* — Jonathan A Boyd
(74) *Attorney, Agent, or Firm* — Cha & Reiter, LLC

(57) ABSTRACT

Various embodiments of the present disclosure relate to an electronic device for supporting a user input and a control method of the electronic device, and the disclosed electronic device may: identify occurrence of a first event; display a first user interface, provided by a first application program, on a display according to the occurrence of the first event; receiving, through the first user interface, a user input including an indicator indicating a category; and when the user input is received, display, on the display, a category corresponding to the user input among at least one category provided by a second application program. Various other embodiments are possible.

15 Claims, 12 Drawing Sheets

(56) References Cited

U.S. PATENT DOCUMENTS

| | | | |
|---|---|---|---|
| 2014/0068515 A1 | 3/2014 | Atacik et al. | |
| 2014/0160045 A1* | 6/2014 | Park | G06F 1/3265 345/173 |
| 2014/0325402 A1* | 10/2014 | Jung | G06F 3/04883 715/763 |
| 2015/0033361 A1 | 1/2015 | Choi et al. | |
| 2015/0067615 A1 | 3/2015 | Sim et al. | |
| 2015/0378590 A1 | 12/2015 | Kim et al. | |
| 2017/0010687 A1* | 1/2017 | Seo | G06F 3/038 |

FOREIGN PATENT DOCUMENTS

| | | |
|---|---|---|
| KR | 10-2012-0078196 A | 7/2012 |
| KR | 10-2014-0026966 A | 3/2014 |
| KR | 10-2015-0013968 A | 2/2015 |
| KR | 10-2015-0025450 A | 3/2015 |
| KR | 10-2016-0000627 A | 1/2016 |
| KR | 10-2017-0007051 A | 1/2017 |
| KR | 10-2017-0056833 A | 5/2017 |

* cited by examiner

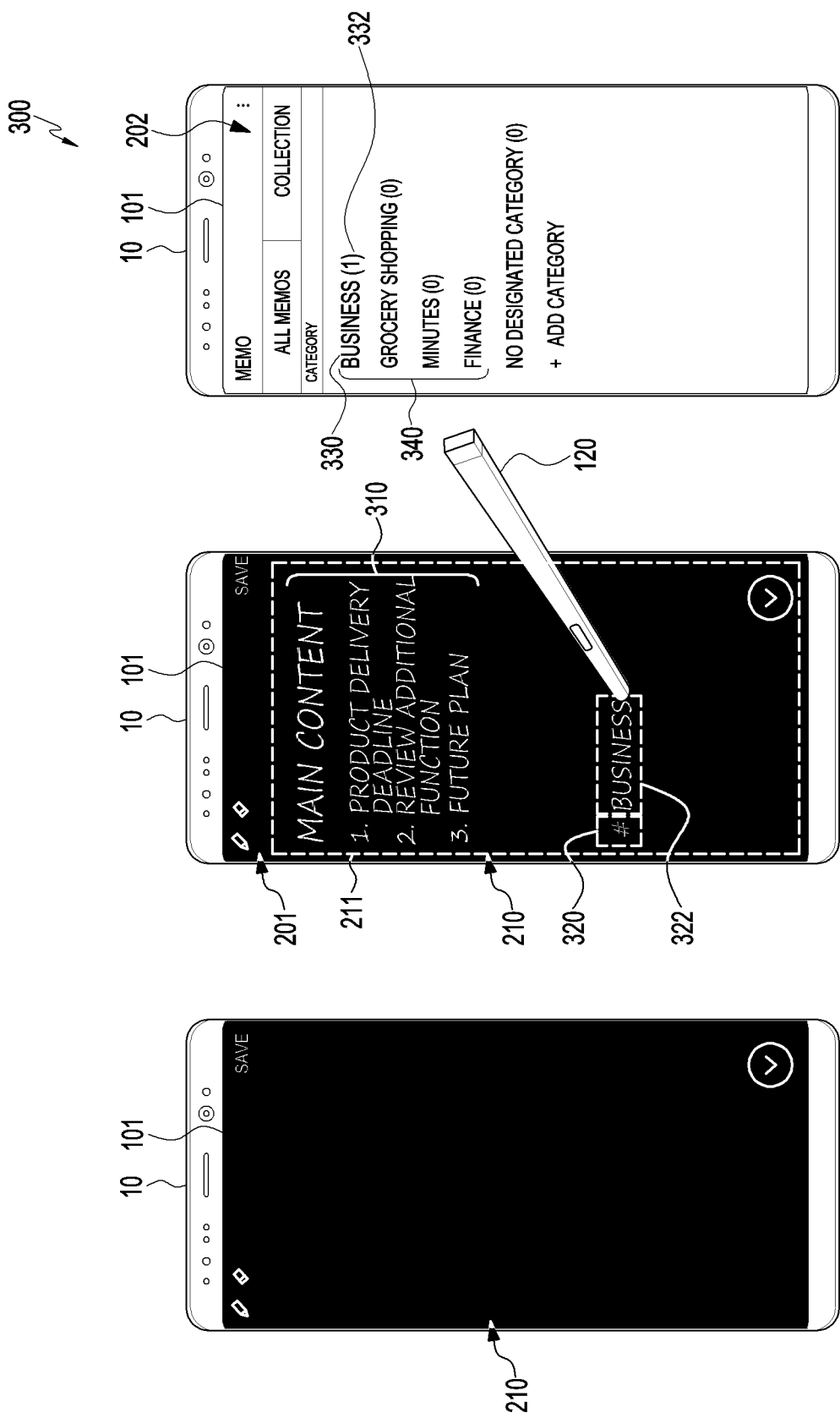

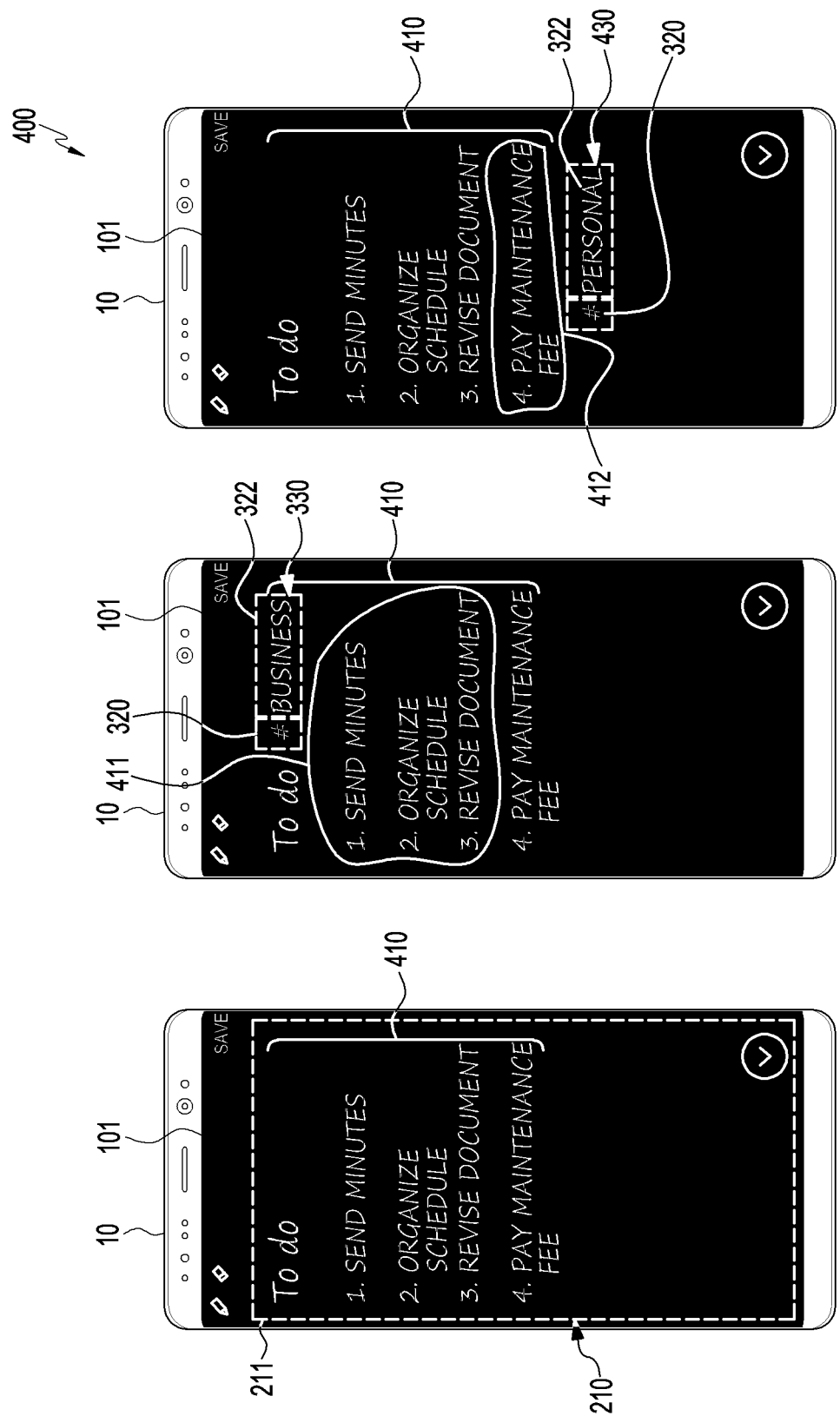

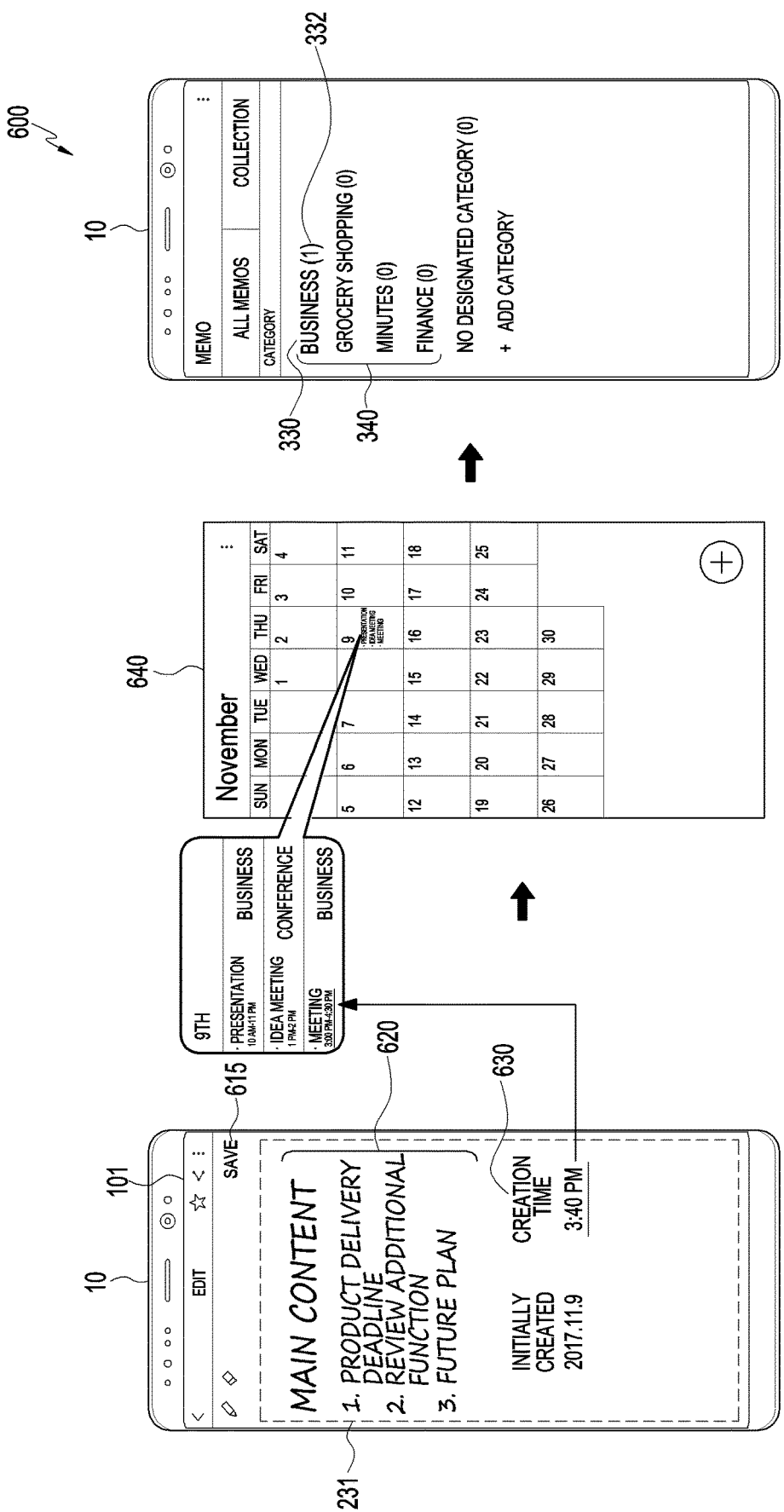

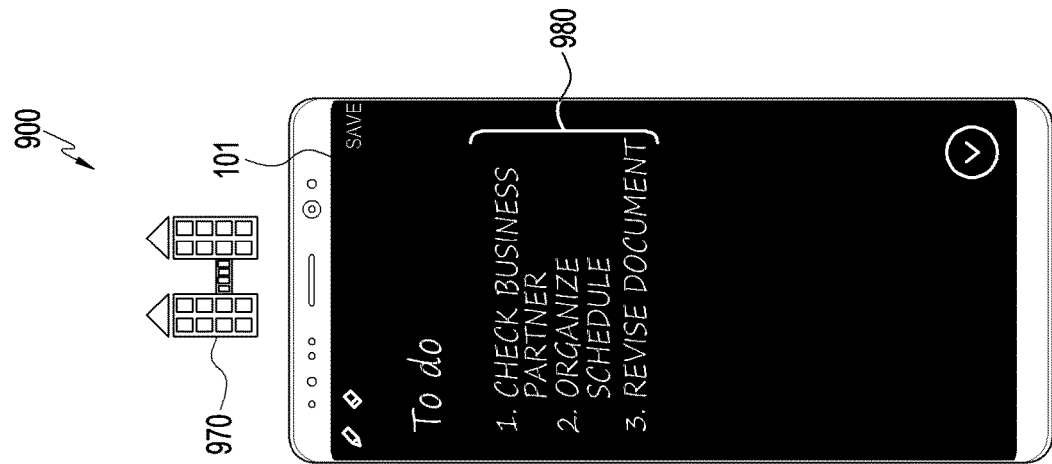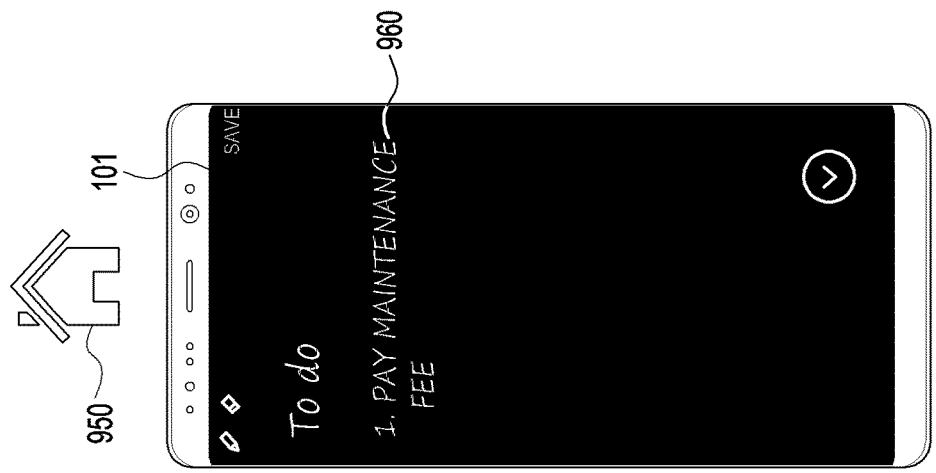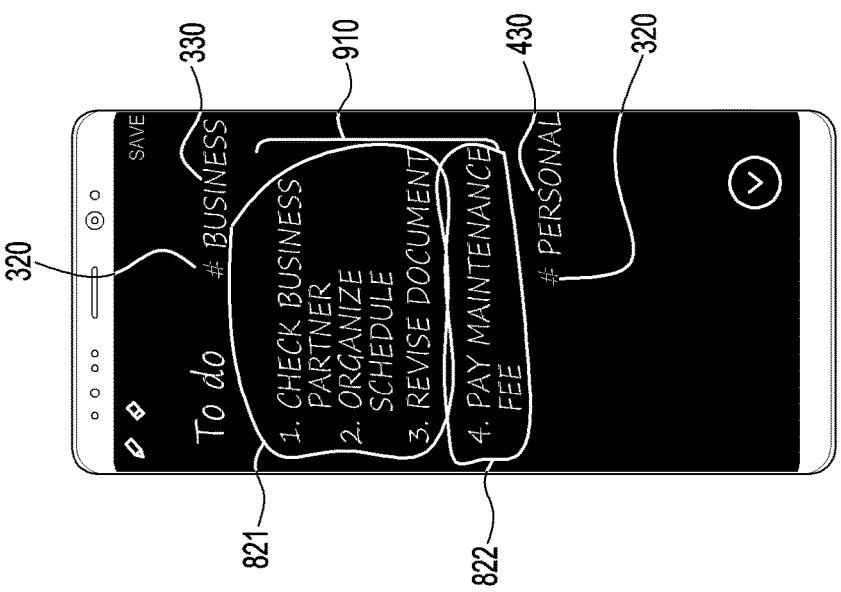

ELECTRONIC DEVICE FOR SUPPORTING USER INPUT AND CONTROL METHOD OF ELECTRONIC DEVICE

CROSS REFERENCE TO RELATED APPLICATIONS

This application is a National Phase Entry of PCT International Application No. PCT/KR2019/009319, which was filed on Jul. 26, 2019, and claims priority to Korean Patent Application No. 10-2018-0087028, which was filed on Jul. 26, 2018, the content of which is incorporated herein by reference.

TECHNICAL FIELD

Various embodiments of the disclosure relate to an electronic device which supports various input methods. Particularly, various embodiments relate to an input method using an electronic pen.

BACKGROUND ART

A mobile communication terminal is widely used as an electronic device. The mobile communication terminal includes a display operated in a touch scheme, and also includes a high-pixel camera module, and thus may not only communicate with a counterpart but also capture still and moving images. Moreover, the mobile communication terminal may reproduce multimedia content such as music and video, and access a network to surf the web. The performance of the processor included in the mobile communication terminal described above has gradually become higher, so as to enable the mobile communication terminal to perform various functions faster.

According to various embodiments, an electronic device may use an electronic pen as an auxiliary device for using various functions.

DETAILED DESCRIPTION OF THE INVENTION

Technical Problem

Functions having similar purposes among various functions of an electronic device may be separated and provided according to a situation of the electronic device. In this case, if respective outputs generated using the similar-purpose functions are not shareable, a user may be required to control the electronic device to share the outputs one by one, and thus the usability of the electronic device may be degraded.

Various embodiments of the disclosure may provide an electronic device for providing a method for sharing data between two application programs providing similar functions according to a situation of the electronic device, and using the data, and a control method thereof.

Technical Solution

An electronic device according to an embodiment may include: a housing; a touchscreen display viewed or exposed through a part of the housing; a wireless communication circuit positioned in the housing; a processor positioned in the housing and operatively connected to the display and the communication circuit; and a memory positioned in the housing and operatively connected to the processor, wherein the memory stores: a first application program for providing a first user interface that is available in a locked state of the electronic device; and a second application program for providing at least one category and a second user interface that is available in an unlocked state of the electronic device, wherein the memory stores instructions which are configured to, when executed, cause the processor in the locked state to: identify occurrence of a first event; in response to the occurrence of the first event, display the first user interface of the first application program on the display; receive a user input including a category-implying indicator through the first user interface; and in response to the reception of the user input, display, on the display, a category corresponding to the user input among the at least one category provided by the second application program.

Advantageous Effects

According to various embodiments of the disclosure, an output generated by a first memo writing application program can be included and stored in a category included in a second memo writing application program.

According to various embodiments of the disclosure, a first user interface included in a first application may be displayed according to the occurrence of a preconfigured event, and an indicator can be input through the first user interface, the indicator instructing to include and store an output generated by a first memo writing application program, in a category included in a second memo writing application program.

BRIEF DESCRIPTION OF DRAWINGS

FIGS. 3A, 3B, and 3C are explanation diagrams for illustrating a situation in which an electronic device designates the category of an input memo and stores the memo according to an embodiment;

FIGS. 4A, 4B, and 4C are explanation diagrams for illustrating a situation in which an electronic device divides an input memo, designates multiple categories, and stores the memo according to an embodiment;

FIGS. 6A, 6B, and 6C are explanation diagrams for illustrating a situation in which an electronic device classifies a memo into a category, based on the creation time point of the memo, and stores the memo according to an embodiment;

FIGS. 9A, 9B, and 9C are explanation diagrams for illustrating another situation in which an electronic device displays a divided memo according to an embodiment;

BRIEF DESCRIPTION OF DRAWINGS

Figure 1A:
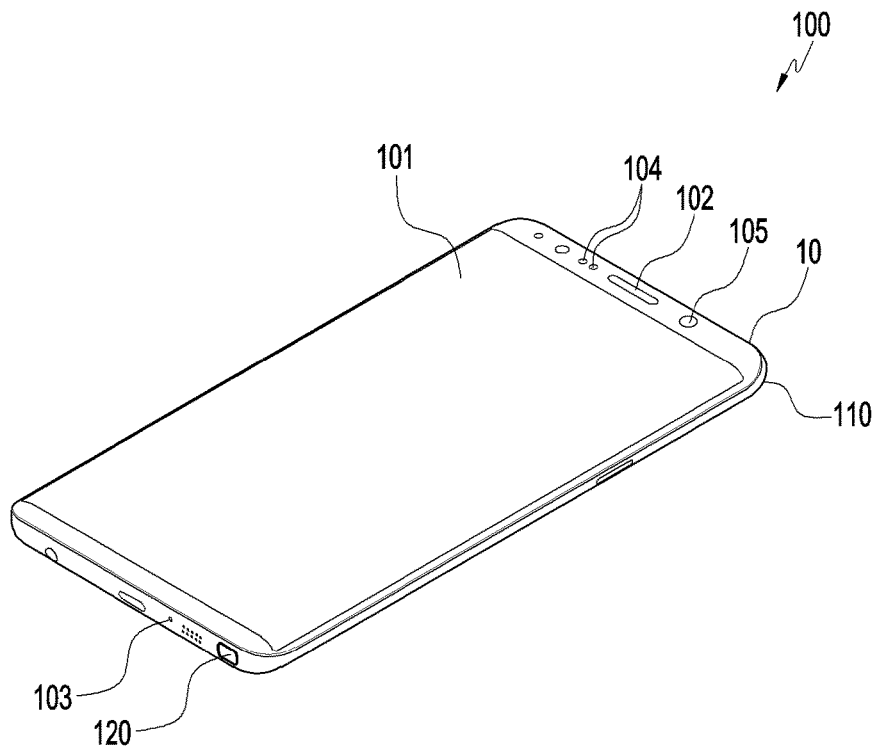
FIGS. 1A and 1B are perspective views of an electronic device including an attachable electronic pen according to various embodiments of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, the disclosure will be described in detail with reference to the accompanying drawings.

Figure 1B:
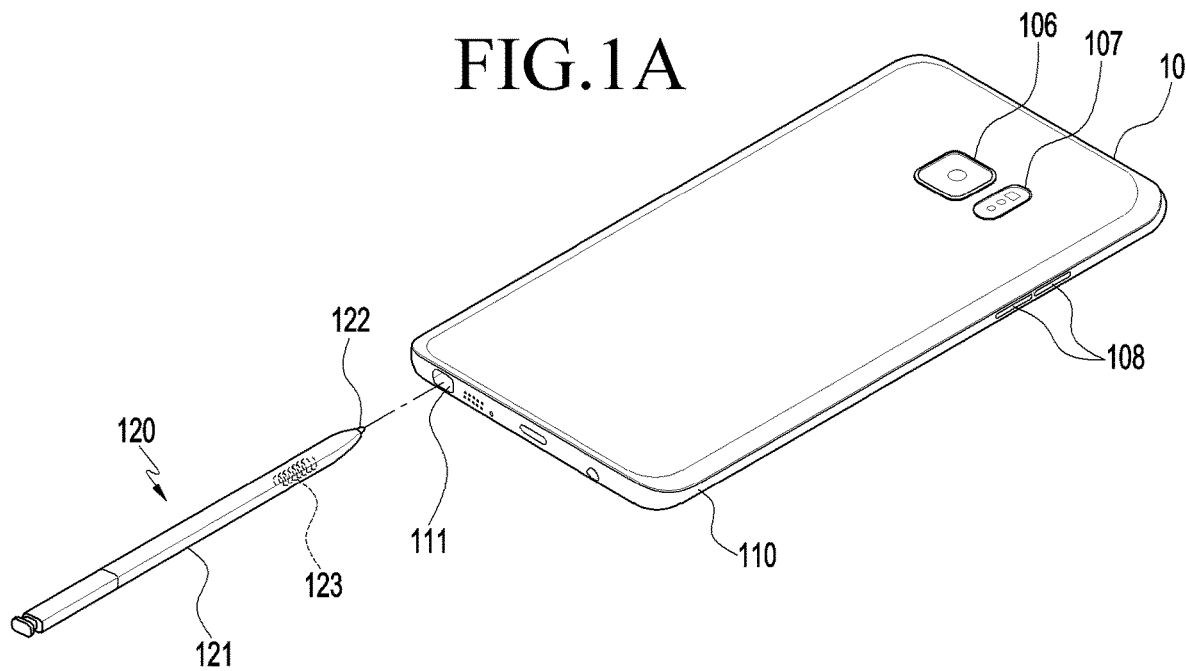

FIGS. 1A and 1B are perspective views 100 of an electronic device including an attachable electronic pen according to various embodiments of the disclosure.

Referring to FIGS. 1A and 1B, a display 101 may be placed on the front surface of a housing 110 of the electronic device 10. A speaker device 102 for outputting the voice of the counterpart may be installed at the upper side of the display 101. A microphone device 103 for transmitting the voice of a user of the electronic device to the counterpart may be installed at the lower side of the display 101.

According to an embodiment, the display 101 may include a touch screen device including a touch sensor. According to an embodiment, the display may include a pressure-sensitive touch screen device including a touch sensor and a force sensor which reacts to a touch pressure.

According to an embodiment, components for performing various functions of the electronic device 10 may be arranged around the speaker device 102. The components may include at least one sensor module 104. The sensor module 104 may include at least one of, for example, an illuminance sensor (e.g. light sensor), a proximity sensor, an infrared sensor, or an ultrasonic sensor. According to an embodiment, a component may include a first camera device 105.

According to an embodiment, a component may include an LED indicator for allowing the user to recognize state information of the electronic device 10. According to an embodiment, components may be also arranged on the rear surface of the electronic device 10. According to an embodiment, a component may also include at least one of a second camera device 106, various sensor modules (e.g. a heart rate sensor, an illuminance sensor, and an ultrasonic sensor), and a lighting device 107. According to an embodiment, a physical key button 108 (e.g. a side key button) may be disposed to protrude from the side surface of the electronic device.

According to an embodiment, the electronic device 10 may include an electronic pen 120 which is placed in a pen-mounting space (or recess) 111 disposed in the housing 110, such that the pen can be selectively attached to or detached from the space. According to an embodiment, the electronic pen 120 may include a coil body 123 and a substrate (not illustrated) electrically connected to the coil body 123 in a hollow pen housing 121 having a predetermined length. According to an embodiment, a sharp tip 122 is disposed on an end of the pen housing 121 to allow the user to easily perform an input operation.

According to an embodiment, the electronic device 10 may include an electromagnetic resonance (EMR) sensor pad for detecting an input position of the electronic pen 120 by an electromagnetic induction scheme. According to an embodiment, the EMR sensor pad may include multiple conductive patterns. According to an embodiment, the electronic device 10 may apply power to the conductive patterns to form an electromagnetic field, and when the electric pen 120 is in contact with the display 101 or is close (hovers) thereto within a predetermined distance, the electronic device may detect the position of the electronic pen 120 by receiving a feedback signal for the resonant frequency of the coil body 123 vibrated by the electromagnetic field.

According to an embodiment, the electronic device 10 may include a detection member for, when the electronic pen 120 is completely inserted in the pen-mounting space 111, detecting a feedback signal for the resonant frequency of the coil body 123. According to an embodiment, the detection member may use the resonant frequency of the coil body 123 provided to implement an electromagnetic induction scheme, as a detection means for detecting whether the electronic pen 120 has been inserted. According to an embodiment, the electronic device 10 may detect a feedback signal of the coil body 120 received by the detection member, to check whether the electronic pen 120 is inserted in the pen-mounting space 111 of the electronic device 10.

Figures 2A, 2B:
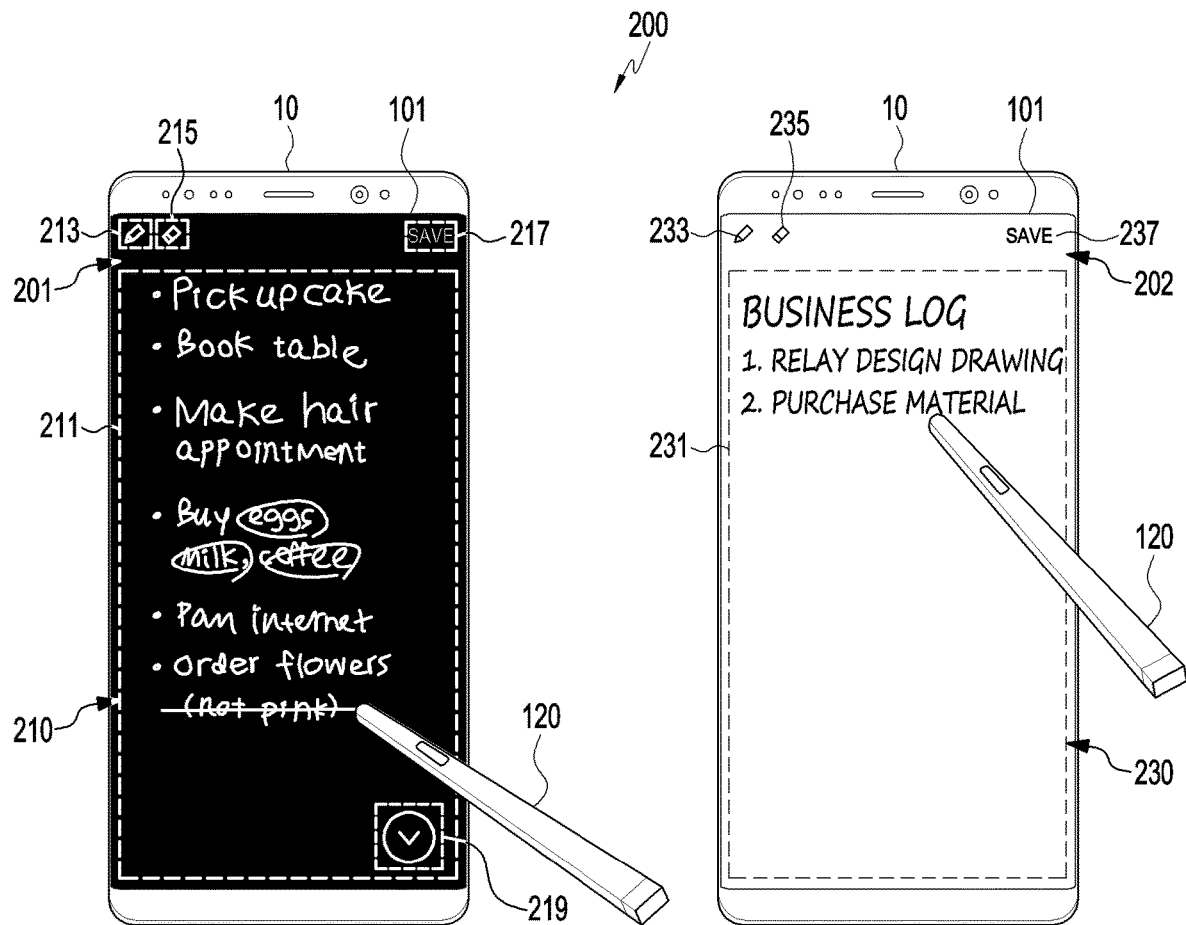
FIGS. 2A and 2B are explanation diagrams for illustrating a situation in which an electronic device executes different memo writing functions according to an embodiment.

FIGS. 2A and 2B are explanation diagrams 200 for illustrating a situation in which an electronic device executes different memo writing functions according to an embodiment.

Referring to FIG. 2A, when at least one pre-defined first event occurs in a low power state, the electronic device 10 may activate at least a partial region of the display 101, and may display a first memo writing application program (e.g. a first memo writing application program 201) which provides a first user interface. The low power state may indicate, for example, a state in which at least some functions of the electronic device 10 are unable to be used (disabled, inactive). Alternatively, the low power state may include a sleep state of the electronic device 10. Alternatively, the low power state may include a state in which the display 101 is turned off, a sensor-inactive state, and a state in which a backlight for the display 101 is turned off. The low power state may be named a locked state of the electronic device 10.

According to an embodiment, the electronic device 10 may provide a memo region related to a handwriting function or a drawing function in at least one activated region of the display 101 according to the execution of the first memo writing application program 201. Furthermore, when a memo input is sensed on the memo region, the electronic device 10 may display the memo input on the memo region.

According to an embodiment, the electronic device 10 may display the memo region by using various colors. For example, the electronic device 10 may display the memo region in black so as to provide the user with the same effect as though the display 101 were turned off.

The memo input may be created by a finger or the electronic pen (or a stylus pen) 120. For example, the memo input may be expressed using a color emerging from the memo region. For example, the memo region may be expressed using a black color, and the memo input may be expressed using a white color or a yellow color. Although the user inputs a memo on the electronic device 10, the above configuration may provide the user with a similar effect as though the user were writing with a pen on a black plate.

According to an embodiment, when a pre-defined first event occurs in a low power state, the electronic device 10 may determine that a memo input is intended by the user. The electronic device 10 may preload at least a part (e.g. a module or a program) of the first memo writing application program 201 on a random access memory (RAM) of a memory in a low power state. Therefore, if the electronic device 10 has come out of the low power state, the electronic device 10 can quickly execute the first memo writing application program 201 by using the part preloaded on the RAM.

According to an embodiment, the electronic device 10 may divide the first memo writing application program 201 into multiple parts (e.g. modules or programs), and determine the priority of each of the multiple parts. The electronic device 10 may preferentially preload a part having a high priority on the RAM. In this case, the divided parts of the first memo writing application program 201 may maintain independence between the divided parts.

According to an embodiment, the electronic device 10 may measure available memory in the RAM, and preload at least a part of the first memo writing application program 201 on the available memory. In this case, the electronic device 10 may preload at least a part of the first memo writing application program 201 on the remaining part excluding minimum required available memory required for smoothly operating the electronic device 10 from the available memory in the RAM. Therefore, the electronic device 10 can preload at least a part of the first memo writing application program 201 on the RAM while considering the smooth operation.

According to an embodiment, a configured first event that induces the execution of the first memo writing application program 201 in a low power state may include a case where separating the electronic pen 120 from the electronic device 10 is sensed. Alternatively, the first event may include a case where an input is received from a pre-configured physical key included in the electronic device 10. Alternatively, the first event may include a case where an input of a pre-defined user gesture is sensed on a touch panel included in the electronic device 10. Alternatively, the first event may include a case where a signal or an input from an external electronic pen (or stylus pen) is sensed on the touch panel included in the electronic device 10.

According to an embodiment, the electronic device 10 may store the first memo writing application program 201 that provides a first user interface 210.

According to an embodiment, the first user interface 210 may include at least one of a memo region 211, a pen setting object 213, an eraser object 215, a memo save object 217, and a next-memo display object 219. However, a function execution object included in the first user interface 210 is not limited thereto.

According to an embodiment, the electronic device 10 may display the first user interface 210 by using various colors. For example, the electronic device 10 may display the first user interface 210 in black so as to provide the user with the same effect as though the display 101 were turned off.

According to various embodiments, the electronic device 10 may receive, as a memo input, a handwriting input or a drawing input through the memo region 211. The handwriting input or the drawing input may be created by the user's finger or the electronic pen 120. The electronic device 10 may express the memo region 211 in a black color, and may express the memo input in a color, such as a white color or a yellow color, that is easily distinguished by the user.

According to various embodiments, if an input for selecting the pen setting object 213 is received, the electronic device 10 may display, on the display 101, a pop-up window for configuring a pen type, displayed line thickness, displayed line color, etc.

According to various embodiments, if an input for selecting the eraser object 215 is received, the electronic device 10 may display, on the display 101, an object for erasing the contents of a pre-input memo.

According to various embodiments, if an input for selecting the memo save object 217 is received, the electronic device 10 may store the content of a memo input to the memo region 211.

According to various embodiments, if an input for selecting the next-memo display object 219 is received, the electronic device 10 may display the new memo region 211 on which an input memo is not displayed.

Referring to FIG. 2B, when at least one pre-defined first event occurs in a low-power release state in which the low power state is released, the electronic device 10 may execute a second memo writing application program (e.g. a second memo writing application program 202) which provides a second user interface 230 and at least one category. The low-power release state may be named an unlocked state of the electronic device 10.

According to an embodiment, the electronic device 10 may provide a memo region 231 through the activated display 101 according to the execution of the second memo writing application program 202, and may also receive a memo input on the memo region 231 by a handwriting function or a drawing function.

According to an embodiment, if at least one pre-defined first event occurs in a low-power release state, the electronic device 10 may load the second memo writing application program 202 on the RAM.

According to an embodiment, the electronic device 10 may store the second memo writing application program which provides the second user interface 230 and the at least one category.

According to an embodiment, the second user interface 230 may include at least one of the memo region 231, a pen setting object 233, an eraser object 235, and a memo save object 237. However, a function execution object included in the second user interface 230 is not limited thereto.

According to an embodiment, the electronic device 10 may display the second user interface 230 by using various colors. For example, the electronic device 10 may display the second user interface 230 in a white color.

According to various embodiments, the memo region 231, the pen setting object 233, the eraser object 235, and the memo save object 237 included in the second user interface 230 may provide functions identical or similar to the functions of the memo region 211, the pen setting object 213, the eraser object 215, and the memo save object 217 included in the first user interface 210, respectively.

According to an embodiment, the category may be generated by the user. For example, the second memo writing application program 202 may display, after a memo is input, the second user interface 230 for allowing the category of the input memo to be selected. The second user interface 230 for allowing the category to be selected may display, for example, a pre-generated category and an execution object (not illustrated) for newly generating a category. The user may select a category in which the user wants to store the input memo, or may select the execution object (not illustrated) for newly generating a category to create a new category and store the input memo therein.

According to various embodiments, the electronic device 10 may execute the second memo writing application program 202 to create a category, based on an input memo.

According to an embodiment, the electronic device 10 may store a memo created by the user's input.

For example, when a pre-defined gesture is sensed on the display 101, the electronic device 10 may determine that a request for saving has occurred. Alternatively, when a pre-defined gesture occurs in a pre-defined region of the display 101, the electronic device 10 may determine that a request for saving has occurred.

The pre-defined gesture may include, for example, inserting the electronic pen 120 into the electronic device 10.

According to an embodiment, when there is a selection made by the user on a menu displayed on the display 101, the electronic device 10 may determine that a request for saving has occurred. Alternatively, when pressing one or more physical keys in a pre-defined scheme is sensed, the electronic device 10 may determine that a request for saving has occurred.

According to an embodiment, the electronic device 10 may store an input memo in a memory included in the electronic device 10. The input memo may be stored in the memory, for example, as a memo file having a format. The memo file may be displayed through an application supporting memo display.

According to an embodiment, the electronic device 10 may store an input memo to be a memo file, and then terminate the first memo writing application program 201 or the second memo writing application program 202.

According to an embodiment, the electronic device 10 may store a memo file created in the process of the operation of the first memo writing application program 201, and then switch the electronic device 10 to a low power state.

According to various embodiments, the first memo writing application program 201 and the second memo writing application program 202 may be executed by distinguishing at least a part (e.g. a module or a program) of one memo writing application program. Alternatively, the first memo writing application program 201 and the second memo writing application program 202 may be implemented as separate application programs.

FIGS. 3A, 3B, and 3C are explanation diagrams 300 for illustrating a situation in which an electronic device designates the category of an input memo and stores the memo according to an embodiment.

Referring to FIG. 3A, in a locked state, the electronic device 10 may identify the occurrence of a first event, and display, on the display 101, a first user interface 210 of a first memo writing application program (e.g. the first memo writing application program 201 in FIGS. 2A and 2B).

According to an embodiment, the electronic device 10 may sense the occurrence of the first event in a locked state.

The locked state may include, for example, a case where the electronic device 10 is in a low power state. The low power state may include, for example, a state where at least some functions of the electronic device 10 are unavailable, a sleep state of the electronic device 10, or a state where the display 101 is turned off.

The occurrence of the first event may correspond to at least one of, for example, a case where the electronic pen 120 is separated from the electronic device 10, a case where an input is received from a pre-configured physical key included in the electronic device 10, a case where a pre-defined gesture of the user is sensed on a touch panel included in the electronic device 10, or a signal or an input is sensed on a touch panel from the external electronic pen 120.

Referring to FIG. 3B, the electronic device 10 may receive a user input including a category-implying indicator through the first user interface 210.

According to an embodiment, the electronic device 10 may receive a user input created on the memo region 211. For example, the electronic device 10 may receive a handwriting input or a drawing input using the electronic pen 120. The electronic device 10 may display a memo input of the user to be a memo content 310 on the memo region 211.

According to an embodiment, the electronic device 10 may identify the input of a category-implying indicator 320 in the memo region 211 included in the first user interface 210. That is, the electronic device 10 may identify that a user input including the memo content 310 and the category-implying indicator 320 are received in the memo region 211. The category-implying indicator 320 may indicate the electronic device 10, for example, to store the memo content 310 input in the memo region 211 in a category 322 written after the category-implying indicator 320.

Referring to FIG. 3B, the category-implying indicator 320 may be the sign "#". However, the type of the category-implying indicator 320 is not limited thereto. For example, the electronic device 10 may provide a user interface allowing a change of the type of the category-implying indicator 320.

According to an embodiment, the electronic device 10 may identify the category 322 written within a pre-configured distance from the category-implying indicator 320 to the right side. The pre-configured distance between the category-implying indicator 320 and the category 322 may be, for example, 13 dp (density-independent pixel) to 23 dp. The density-independent pixel may indicate, for example, a virtual pixel unit which, when the size and placement of elements is designated on the display 101, allows independent designation of the size regardless of the resolution of the display 101. For example, in the display 101 supporting a 2560×1440 resolution, 13 dp may indicate approximately 40 pixels, and 23 dp may indicate 70 pixels. According to an embodiment, 40 pixels may indicate approximately 1.05 cm, and 70 pixels may indicate 1.85 cm. That is, the electronic device 10 may identify the category 322 by recognizing a letter positioned at 1.05 to 1.85 cm from the category-implying indicator 320 to the right side.

The electronic device 10 may include and store the input memo content 310 in the written category 322 in response to a user input including the memo content 310, the category-implying indicator 320, and the category 322.

Referring to FIG. 3C, the electronic device 10 may display, on the display 101, a category corresponding to a user input among categories included in the second memo writing application program 202 in response to the reception of the user input.

Referring to FIG. 3C, the electronic device 10 may display, on the display 101, one or more categories 340 included in a second memo writing application program (e.g. the second memo writing application program 202 in FIGS. 2A and 2B).

According to various embodiments, the electronic device 10 may create a category by a user input, or the electronic device 10 may create a category, based on the contents of an memo input using the second memo writing application program 202 executed by the user.

According to an embodiment, the electronic device 10 may display, distinguishably from the other categories, at least one category corresponding to a user input among the categories 340 included in the second memo writing application program 202 in response to the reception of the user input. For example, the electronic device 10 may display, on the display 101, the multiple categories 340 included in the second memo writing application program 202. The electronic device 10 may display an object and the category 330 (e.g. business category) written together with the indicator 320 among the multiple categories 340, to be adjacent to each other, the object indicating that the number of memos included in the category 330 written together with the indicator 320 has been increased.

Referring to FIG. 3C, the electronic device 10 may simultaneously display the pre-stored multiple categories 340 and a number 332 to be adjacent to the "business" category 330 including a newly stored memo among the multiple categories 340, to display the number of memos stored in the "business" category 330.

In this case, the electronic device 10 may display the number 332 to be thicker than the other letters, or to have a different color. Therefore, the electronic device 10 can display that a new memo has been added to the "business" category 330. However, a method for notifying of the addition of a memo is not limited thereto. For example, the electronic device 10 may display the word "business" to be thicker, or to have a different color.

As described above, according to an embodiment of the disclosure, the electronic device 10 may store a memo created in the first memo writing application program 201, in a category included in the second memo writing application program 202.

Specifically, without a separate process of selecting a category after a memo is input, the electronic device 10 may execute the first memo writing application program 201, and input a memo and write the indicator 320 and the category 322 in which the memo is desired to be included and stored. Therefore, the electronic device can easily include and store the input memo in the category included in the second memo writing application program 202.

FIGS. 4A, 4B, and 4C are explanation diagrams 400 for illustrating a situation in which an electronic device divides an input memo, designates multiple categories, and stores the memo according to an embodiment.

Referring to FIG. 4A, the electronic device 10 may receive a user input through the first user interface 210.

According to an embodiment, the electronic device 10 may receive a user input created on the memo region 211. For example, the electronic device 10 may receive a handwriting input or a drawing input using the electronic pen 120. The electronic device 10 may display a memo input of the user to be a memo content 410 on the memo region 211.

Referring to FIG. 4B, the electronic device 10 may receive a user input for dividing the input memo content 410 into multiple pieces. For example, the electronic device 10 may receive, as a user input, a divider for dividing the input memo content 410 by means of a looped curve.

According to an embodiment, the user may input a first looped curve 411 for selecting a part of the input memo content 410. The user may input the first looped curve 411, and then input a category-implying indicator 320 and a category 322. For example, the user may input the first looped curve 411, then write "#", which is the category-implying indicator 320, to be adjacent to the first looped curve 411, and then write a "business" category 330.

According to an embodiment, the electronic device 10 may store the memo content 410 in the category 330 input together with the category-implying indicator 320. For example, the electronic device 10 may store the memo content 410 in the "business" category.

Referring to FIG. 4C, the user may input a second looped curve 412 for selecting the remaining region which has not been selected in the memo content 410 by means of the first looped curve 411. The user may input the second looped curve 412, and then input a category-implying indicator 320 and a category 322. For example, the user may input the second looped curve 412, then write "#", which is the category-implying indicator 320, to be adjacent to the second looped curve 412, and then write a "personal" category 430.

According to an embodiment, the electronic device 10 may store the memo content 410 in a category input together with the category-implying indicator 320. For example, the electronic device 10 may store the memo content 410 in the "personal" category.

As described above, the electronic device 10 can duplicately store the contents of a single memo in multiple categories 340 in response to a user input for dividing the single memo.

According to various embodiments, a divider for dividing the contents of a single memo into multiple pieces is not limited to a looped curve with a solid line. For example, the electronic device 10 may recognize, as a divider, a looped curve which may be formed in various line types, such as a dotted line or an alternate long and short dash line. The electronic device 10 may device an input memo by using various types of dividers.

Figure 5:
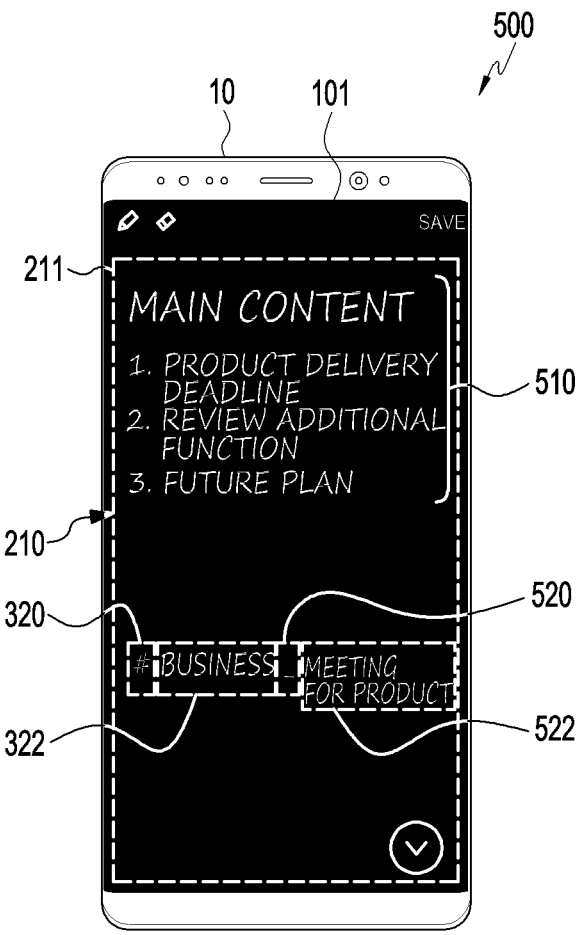
FIG. 5 is an explanation diagram for illustrating a situation in which an electronic device designates the name of an input memo and stores the memo according to an embodiment.

FIG. 5 is an explanation diagram 500 for illustrating a situation in which an electronic device designates the name of an input memo and stores the memo according to an embodiment.

Referring to FIG. 5, the electronic device 10 may receive a user input including a name-implying indicator 520 through the first user interface 210.

According to an embodiment, the electronic device 10 may receive a user input created on the memo region 211. For example, the electronic device 10 may receive a handwriting input or a drawing input using the electronic pen 120. The electronic device 10 may display a memo input of the user to be a memo content 510 on the memo region 211.

According to an embodiment, the electronic device 10 may identify the input of the name-implying indicator 520 in the memo region 211 included in the first user interface 210. The electronic device 10 may identify that a user input including the memo content 510 and the name-implying indicator 520 are received in the memo region 211. The name-implying indicator 520 may indicate the electronic device 10, for example, to store the memo content 510 input in the memo region 211 with a name 522 written after the name-implying indicator 520.

Referring to FIG. 5, the name-implying indicator 520 may be the sign "_". However, the type of the name-implying indicator 520 is not limited thereto. For example, the electronic device 10 may provide a user interface allowing a change of the type of the name-implying indicator 520.

According to an embodiment, the electronic device 10 may identify the name 522 written after the name-implying indicator 520. The electronic device 10 may determine the name of the input memo content 510 and store the memo content with the name in response to a user input including the memo content 510, the name-implying indicator 520, and the name 522.

According to various embodiments, the name-implying indicator 520 may be used, for example, together with the category-implying indicator 320. That is, the electronic device 10 may determine the name of the input memo content 510, and include and store the memo content in the written category 322 in response to a user input including the memo content 510, the category-implying indicator 320, the category, the name-implying indicator 520, and the name 522.

FIGS. 6A, 6B, and 6C are explanation diagrams 600 for illustrating a situation in which an electronic device classifies a memo into a category, based on the creation time point of the memo, and stores the memo according to an embodiment.

Referring to FIG. 6A, the electronic device 10 may receive a memo input through a memo region 231.

According to an embodiment, the electronic device 10 may receive a user input created on the memo region 231. For example, the electronic device 10 may receive a handwriting input or a drawing input using the electronic pen 120. The electronic device 10 may display a memo input of the user to be a memo content 620 on the memo region 231.

According to an embodiment, when there is a selection made by the user to select a memo save execution object 615 displayed on the display 101, the electronic device 10 may determine that a save request for requesting to save the memo content 620 written on the display 101 has occurred. Alternatively, when pressing one or more physical keys in a pre-defined scheme is sensed, the electronic device 10 may determine that a save request for requesting to save the memo content 620 written on the display 101 has occurred. Alternatively, when the electronic pen 120 is inserted in the electronic device 10, the electronic device 10 may determine that a save request has occurred.

According to an embodiment, in a case where the input memo content 620 is stored, the electronic device 10 may identify the time point at which the content is stored. In a case where the memo content 620 is stored, the electronic device 10 may display the time point 630 at which the content is stored, on the display 101. However, the disclosure is not limited thereto. For example, the electronic device may store the memo content 620, and then display the time point at which the memo content 620 is stored, on the display 101 when the stored memo content 620 is checked.

The storage time point 630 may indicate, for example, a time point at which the electronic device 10 stores the memo content 620 by a selection of the user. However, the disclosure is not limited thereto. For example, the storage time point 630 may indicate a time point at which the memo content 620 is last revised by the user.

Referring to FIG. 6B, the electronic device 10 may compare a schedule stored in a schedule application program 640 with the time point 630 at which the memo content 620 is stored. The electronic device 10 may identify the type of a schedule stored in the schedule application program 640, the schedule having the same time slot as that of the time point 630 at which the memo content 620 is stored.

For example, the electronic device 10 may identify that the memo content 620 was stored at 3:40 pm. In addition, the electronic device 10 may identify, using the schedule application program 620, that there is a meeting schedule related to "business" at 3:40 pm.

According to an embodiment, the electronic device 10 may identify that the memo content 620 written at 3:40 pm was written at the time of the meeting related to "business".

Referring to FIG. 6C, the electronic device 10 may store the memo content 620 in a "business" category 330.

Referring to FIG. 6C, the electronic device 10 may display, on the display 101, categories 340 included in the second memo writing application program 202.

Referring to FIG. 6C, the electronic device 10 may display both the pre-stored multiple categories 340 and a number 332 to be adjacent to the "business" category 330 including a newly stored memo among the multiple categories 660, to display the number of memos stored in the "business" category 330.

In this case, the electronic device 10 may display the number 332 to be thicker than the other letters, or to have a different color. Therefore, the electronic device 10 can display that a new memo has been added to the "business" category 330. However, a method for notifying of the addition of a memo is not limited thereto. For example, the electronic device 10 may display the word "business" to be thicker, or to have a different color.

As described above, according to an embodiment of the disclosure, the electronic device 10 may determine a category in which a memo is to be stored, by using the time point at which the memo is stored, and a schedule pre-stored in schedule information.

Figures 7A, 7B, 7C:
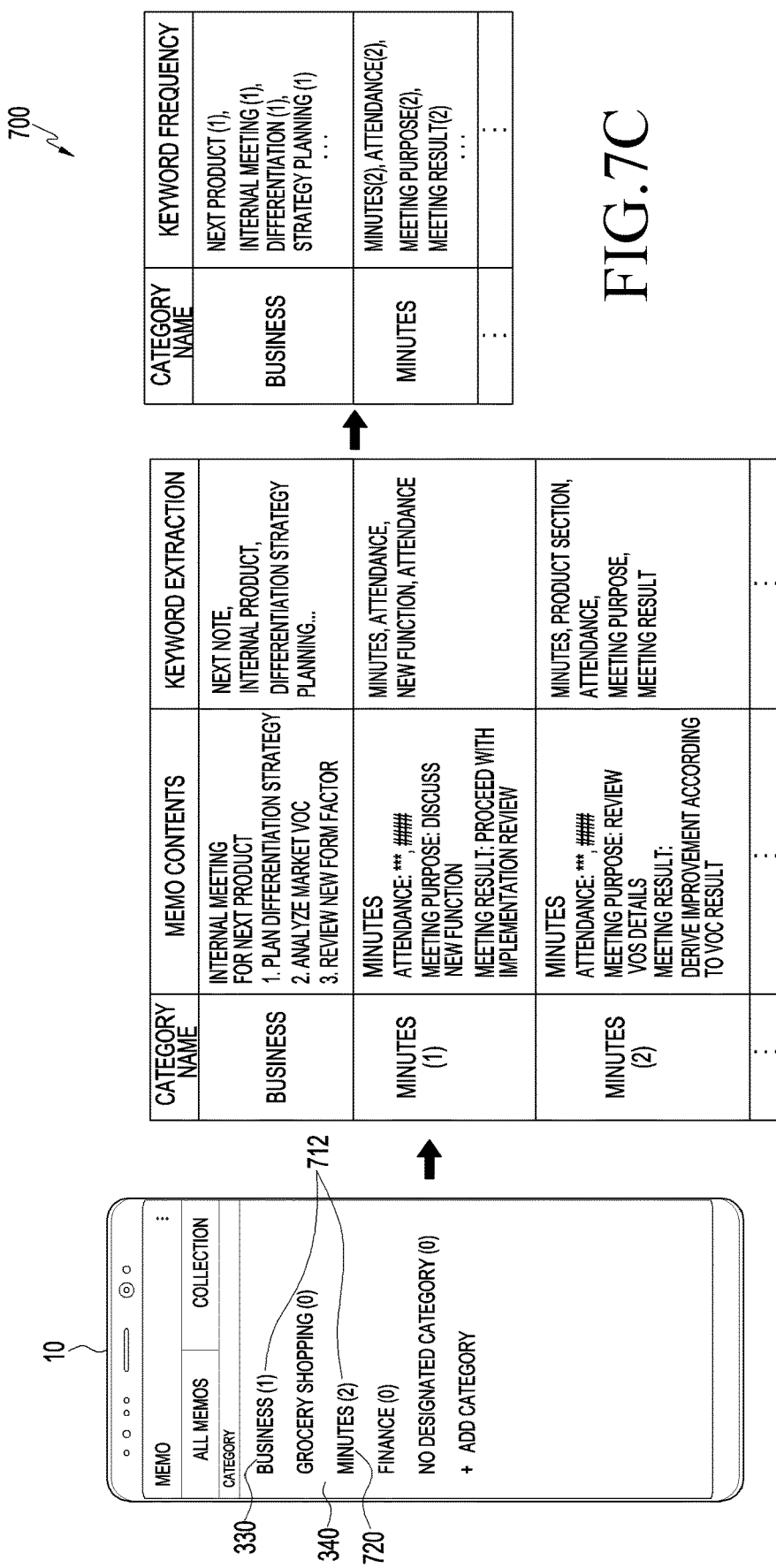
FIGS. 7A, 7B, and 7C are explanation diagrams for illustrating a process in which an electronic device extracts a word having high frequency of use for each of categories, based on the categories of pre-classified memos according to an embodiment.

FIGS. 7A, 7B, and 7C are explanation diagrams 700 for illustrating a process in which an electronic device extracts a word having high frequency of use for each of categories, based on the categories of pre-classified memos according to an embodiment.

Referring to FIG. 7A, the electronic device 10 may display pre-stored multiple categories 340. In this case, the electronic device 10 may display the number 712 of memos stored in each of the categories together with the categories.

Referring to FIG. 7B, the electronic device 10 may extract a keyword, based on the contents of memos belonging to each of the categories.

According to an embodiment, the electronic device 10 may extract a keyword from the contents of memos belonging to the "business" category 330. For example, the electronic device 10 may extract a keyword, such as "next product", "internal meeting", "differentiation", and "strategy planning", from a memo belonging to the "business" category 330.

According to an embodiment, the electronic device 10 may extract a keyword from the contents of a memo belonging to a "minutes" category 720. For example, the electronic device 10 may extract a keyword, such as "minutes", "attendance", and "new function", from a first memo belonging to the "minutes" category 720.

According to an embodiment, the electronic device 10 may extract a keyword, such as "minutes", "product section", "attendance", "meeting purpose", and "meeting result", from a second memo belonging to the "minutes" category 720.

Referring to FIG. 7C, the electronic device 10 may obtain the frequency of a keyword for each category.

According to an embodiment, the electronic device 10 may obtain a word or a sentence frequently used in memos belonging to the "business" category 330. For example, the electronic device 10 may identify that each of "next product", "internal meeting", "differentiation", and "strategy planning" are used once.

According to an embodiment, the electronic device 10 may obtain a word or a sentence frequently used in memos belonging to the "minutes" category 720. For example, the electronic device 10 may identify that each of "minutes", "attendance", "meeting purpose", and "meeting result" are used two times.

According to an embodiment, the electronic device 10 may obtain a word or a sentence frequently used for each category by repeating the above process. Through this configuration, the electronic device 10 may propose a revision of a category input by the user, or may estimate the category of a memo, the category of which has failed to be input by the user, and present the category to the user.

Figure 8C:
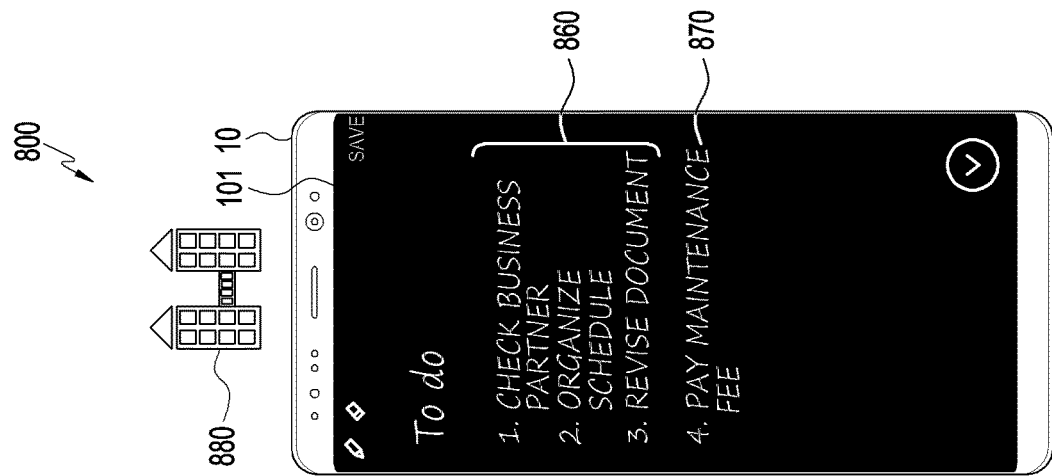
FIGS. 8A, 8B, and 8C are explanation diagrams for illustrating a situation in which an electronic device displays a divided memo according to an embodiment.
Figure 8B:
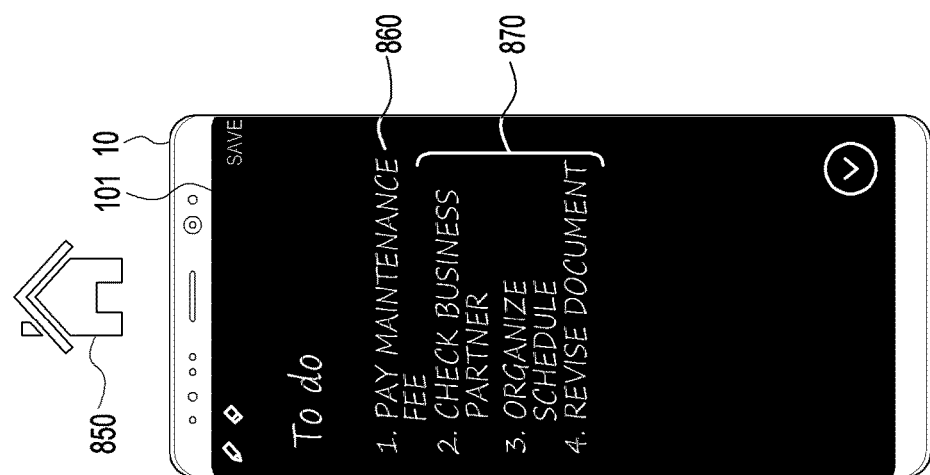
Figure 8A:
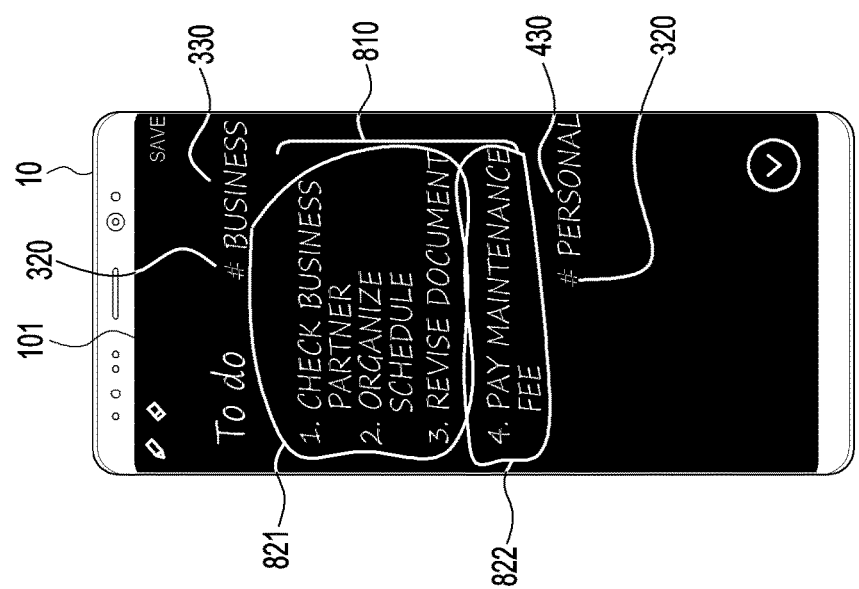

FIGS. 8A, 8B, and 8C are explanation diagrams 800 for illustrating a situation in which an electronic device displays a divided memo according to an embodiment.

Referring to FIG. 8A, the user may input a first looped curve 821 for selecting a part of an input memo content 810. For example, the user may input the first looped curve 821, then write "#", which is a category-implying indicator 320, to be adjacent to the first looped curve 821, and then write a "business" category 330. The electronic device 10 may store the memo content 810 in the "business" category 330.

According to an embodiment, the user may input a second looped curve 822 for selecting the remaining region of the memo content 810, which has not been selected by means of the first looped curve 821. For example, the user may input the second looped curve 822, then write "#", which is the category-implying indicator 320, to be adjacent to the second looped curve 822, and then write a "personal" category 430. The electronic device 10 may store the memo content 810 in the "personal" category 430.

Referring to FIGS. 8B and 8C, the electronic device 10 may differently display the pre-stored memo content 810 according to the place at which the electronic device 10 is located. The electronic device 10 may identify the current position of the electronic device 10, for example, by using a global positioning system (GPS).

Referring to FIG. 8B, the electronic device 10 may be located in a personal space (e.g. a house) 850 of the user.

According to an embodiment, the electronic device 10 may identify that the electronic device is currently located in the house 850 of the user, and when the stored memo content 810 is displayed, the electronic device may display a part 860 input as the "personal" category 430 in the memo content 810 in an upper portion of the display 101. The electronic device 10 may display the remaining part 870 of the memo content 810 below the part 860 input as the "personal" category 430.

Referring to FIG. 8C, the electronic device 10 may be located in a business space (e.g. a company) 880 of the user.

According to an embodiment, the electronic device 10 may identify that the electronic device is currently located in the company 880 of the user, and when the stored memo content 810 is displayed, the electronic device may display a part 860 input as the "business" category 330 in the memo content 810 in an upper portion of the memo. The electronic device 10 may display the remaining part 870 of the memo content 810 below the part 860 input as the "business" category 330.

FIGS. 9A, 9B, and 9C are explanation diagrams 900 for illustrating another situation in which an electronic device displays a divided memo according to an embodiment.

Referring to FIG. 9A, the user may input a first looped curve 821 for selecting a part of an input memo content 910. For example, the user may input the first looped curve 821, then write "#", which is a category-implying indicator 320, to be adjacent to the first looped curve 821, and then write a "business" category 330. The electronic device 10 may store the memo content 910 in the "business" category 330.

According to an embodiment, the user may input a second looped curve 822 for selecting the remaining region of the memo content 910, which has not been selected by means of the first looped curve 821. For example, the user may input the second looped curve 822, then write "#", which is the category-implying indicator 320, to be adjacent to the second looped curve 822, and then write a "personal" category 430. The electronic device 10 may store the memo content 910 in the "personal" category 430.

Referring to FIGS. 9B and 9C, the electronic device 10 may differently display the pre-stored memo according to the place at which the electronic device 10 is located.

Referring to FIG. 8B, the electronic device 10 may be located in a personal space (e.g. a house) 950 of the user.

According to an embodiment, the electronic device 10 may identify that the electronic device is currently located in the house 950 of the user, and when the stored memo content 910 is displayed, the electronic device may display only a part 960 input as the "personal" category 940 in the memo, on the display 101. In this case, the electronic device 10 may not display the remaining part of the memo content 910.

Referring to FIG. 9C, the electronic device 10 may be located in a business space (e.g. a company) 970 of the user.

According to an embodiment, the electronic device 10 may identify that the electronic device is currently located in the company 970 of the user, and when the stored memo content 910 is displayed, the electronic device may display only a part 980 input as the "business" category in the memo, on the display 101. In this case, the electronic device 10 may not display the remaining part of the memo content 910.

Figure 10:
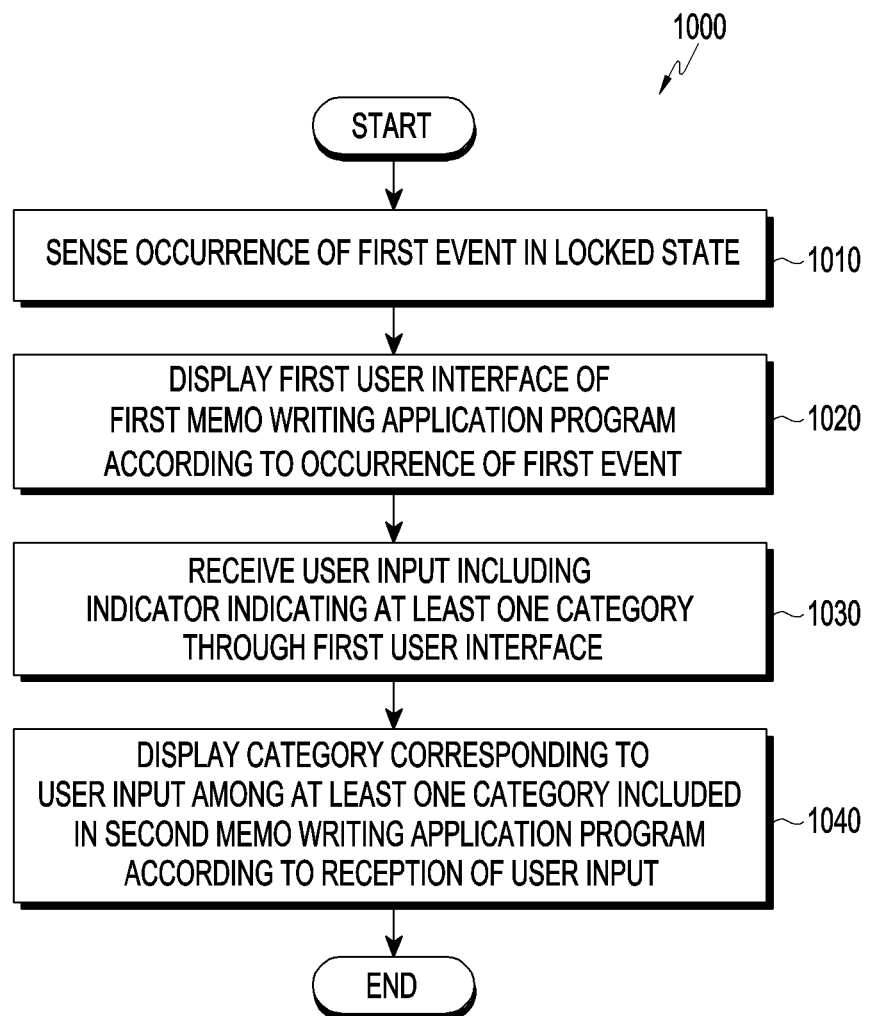
FIG. 10 is a flowchart for illustrating a situation in which an electronic device designates the category of an input memo and stores the memo according to an embodiment.

FIG. 10 is a flowchart for illustrating a situation in which an electronic device designates the category of an input memo and stores the memo according to an embodiment.

Referring to operation 1010, the electronic device 10 may identify the occurrence of a first event in a locked state.

For example, in a low power state or a sleep state, the electronic device 10 may identify that the electronic pen 120 is separated from the electronic device 10, or a signal is input from an external electronic pen on a touch panel.

Referring to operation 1020, the electronic device 10 may display a first user interface of a first memo writing application program according to the occurrence of the first event.

According to an embodiment, the first memo writing application program may be the first memo writing application program. The first user interface may include a memo region in which a memo input of the user is received.

Referring to operation 1030, the electronic device 10 may receive a user input including an indicator indicating at least one category through the first user interface.

According to an embodiment, the electronic device 10 may receive a user input created on the memo region included in the first user interface. The electronic device 10 may identify that the user input including the category-implying indicator, the category, and the memo input is received in the memo region.

Referring to operation 1040, the electronic device 10 may display a category corresponding to the user input among at least one category included in a second memo writing application program according to the reception of the user input.

According to an embodiment, the second memo writing application program may be the second memo writing application program. If the user input including the category-implying indicator is received, the electronic device 10 may store the written memo in the category written together with the category-implying indicator by the user among categories previously stored in the second memo writing application program.

According to an embodiment, the electronic device 10 may display the category in which the memo is stored.

Figure 11:
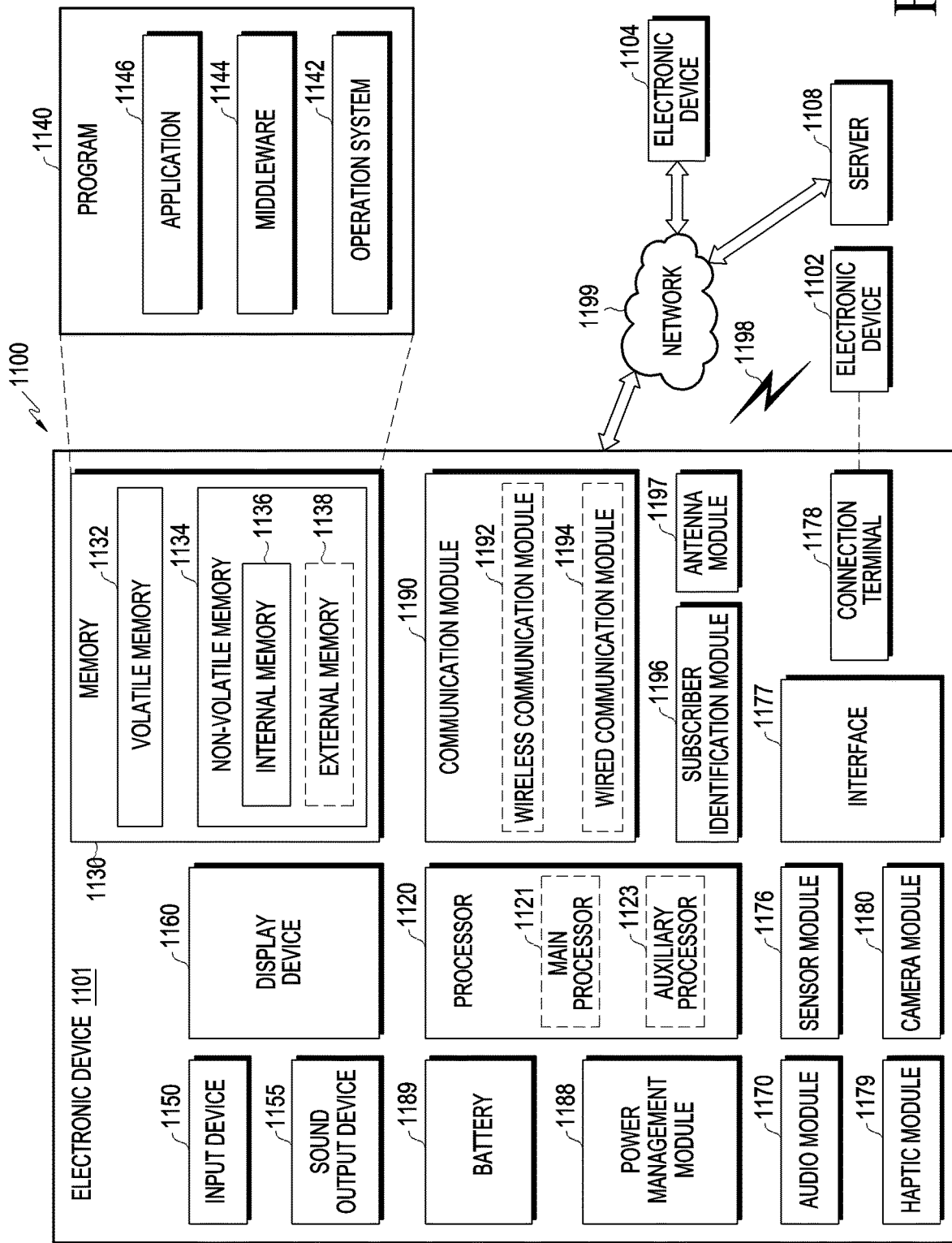
FIG. 11 is a block diagram of an electronic device in a network environment according to various embodiments.

FIG. 11 is a block diagram illustrating an electronic device 1101 in a network environment 1100 according to various embodiments. The electronic device 1101 may include the electronic device 10 of FIG. 1. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control, for example, at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active (e.g., executing an application) state. According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by a component (e.g., the processor 1120) of the electronic device 1101, from the outside (e.g., a user) of the electronic device 1101. The input device 1150 may include, for example, a microphone, a mouse, an electronic pen, or a keyboard.

The electronic pen (e.g., the electronic pen 120 of FIG. 1) may include a lengthily extended housing (e.g., the housing 121 of FIG. 1) including a first end and a second end. The electronic pen 120 may include a button (not shown) disclosed on the external surface of the housing (e.g., the housing 121 of FIG. 1), an EMR coil unit (e.g., the coil body 123) including a dielectric tip (e.g., the tip 122 of FIG. 1) in the housing, and at least one printed circuit board. The printed circuit board may be electrically connected to the EMR coil unit.

The electronic pen 120 may selectively determine an EMR input type and a low power Bluetooth input type for an input of the button (not shown) disposed on the external surface of the housing, and may transmit a signal according to a user input to the electronic device 1101.

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or an external electronic device (e.g., an electronic device 1102 (e.g., a speaker or a headphone)) directly or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image and moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and support a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include one or more antennas, and at least one antenna appropriate for a communication scheme used in the communication network, such as the first network 1198 or the second network 1199, may be selected, for example, by the communication module 1190 from the one or more antennas. The signal or the power may then be transmitted or received between the communication module 1190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

Figure 12:
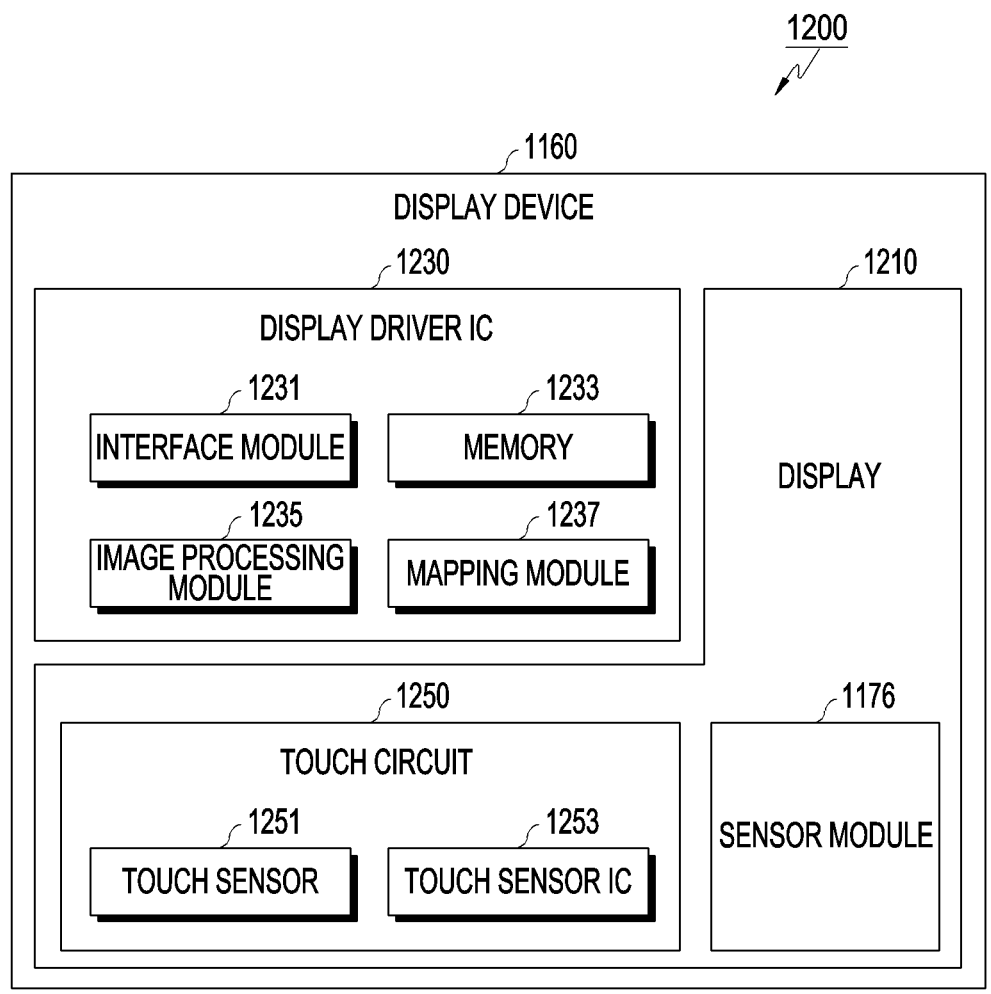
FIG. 12 illustrates a block diagram of a display device according to various embodiments.

FIG. 12 is a block diagram 1200 illustrating the display device 1160 according to various embodiments. Referring to FIG. 12, the display device 1160 may include a display 1210 and a display driver integrated circuit (DDI) 1230 to control the display 1210. The DDI 1230 may include an interface module 1231, memory 1233 (e.g., buffer memory), an image processing module 1235, or a mapping module 1237. The DDI 1230 may receive image information that contains image data or an image control signal corresponding to a command to control the image data from another component of the electronic device 1101 via the interface module 1231. For example, according to an embodiment, the image information may be received from the processor 1120 (e.g., the main processor 1121 (e.g., an application processor)) or the auxiliary processor 1123 (e.g., a graphics processing unit) operated independently from the function of the main processor 1121. The DDI 1230 may communicate, for example, with touch circuitry 1250 or the sensor module 1176 via the interface module 1231. The DDI 1230 may also store at least part of the received image information in the memory 1233, for example, on a frame by frame basis. The image processing module 1235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1210. The mapping module 1237 may generate a voltage value or a current value corresponding to the image data pre-processed or post-processed by the image processing module 1135. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 1210. At least some pixels of the display 1210 may be driven, for example, based at least in part on the voltage value or the current value such that visual information (e.g., a text, an image, or an icon) corresponding to the image data may be displayed via the display 1210.

According to an embodiment, the display device 1160 may further include the touch circuitry 1250. The touch circuitry 1250 may include a touch sensor 1251 and a touch sensor IC 1253 to control the touch sensor 1251. The touch sensor IC 1253 may control the touch sensor 1251 to sense a touch input or a hovering input with respect to a certain position on the display 1210. To achieve this, for example, the touch sensor 1251 may detect (e.g., measure) a change in a signal (e.g., a voltage, a quantity of light, a resistance, or a quantity of one or more electric charges) corresponding to the certain position on the display 1210. The touch circuitry 1250 may provide input information (e.g., a position, an area, a pressure, or a time) indicative of the touch input or the hovering input detected via the touch sensor 1251 to the processor 1120. According to an embodiment, at least part (e.g., the touch sensor IC 1253) of the touch circuitry 1250 may be formed as part of the display 1210 or the DDI 1230, or as part of another component (e.g., the auxiliary processor 1123) disposed outside the display device 1160.

According to an embodiment, the display device 1160 may further include at least one sensor (e.g., a fingerprint sensor, an iris sensor, a pressure sensor, or an illuminance sensor) of the sensor module 1176 or a control circuit for the at least one sensor. In such a case, the at least one sensor or the control circuit for the at least one sensor may be embedded in one portion of a component (e.g., the display 1210, the DDI 1230, or the touch circuitry 1250)) of the display device 160. For example, when the sensor module 1176 embedded in the display device 1160 includes a biometric sensor (e.g., a fingerprint sensor), the biometric sensor may obtain biometric information (e.g., a fingerprint image) corresponding to a touch input received via a portion of the display 1210. As another example, when the sensor module 1176 embedded in the display device 1160 includes a pressure sensor, the pressure sensor may obtain pressure information corresponding to a touch input received via a partial or whole area of the display 1210. According to an embodiment, the touch sensor 1251 or the sensor module 1176 may be disposed between pixels in a pixel layer of the display 1210, or over or under the pixel layer.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing;
   a touchscreen display viewed or exposed through a part of the housing;
   a processor positioned in the housing and operatively connected to the touchscreen display; and
   a memory positioned in the housing and operatively connected to the processor,
   wherein the memory stores:
      a plurality of categories into which data is sorted for storage;
      a first application program providing a first user interface for receiving the data, the first application program being available for execution in a locked state of the electronic device; and
      a second application program in which the plurality of categories are viewable and a second user interface, the second application program being available in an unlocked state of the electronic device,
   wherein the memory stores instructions which are configured to, when executed, cause the processor to:
      while executing the locked state, identify occurrence of a first event;
      in response to identifying the occurrence of the first event, control the touchscreen display to display the first user interface of the first application program while maintaining the locked state;
      receive a user input including one or more text strings including a category-implying indicator and a memo content input through the first user interface;
      control the touchscreen display to display, on the first user interface, the one or more text strings and the memo content; and
      based in part on detecting the category-implying indicator, control the touchscreen display to display a first category corresponding to at least a portion of the one or more text strings from among the plurality of categories,
   wherein the memo content is stored, in the memory, in association with the first category based in part on detecting the category-implying indicator.

2. The electronic device according to claim 1, wherein the instructions are configured to cause the processor to sense the first event by identifying that a stylus pen is separated from the electronic device.

3. The electronic device according to claim 1, wherein the instructions are configured to cause the processor to sense the first event by sensing a signal from an external stylus pen.

4. The electronic device according to claim 1, wherein further comprising a wireless communication circuit positioned in the housing, and
   wherein the user input includes an input detected on the touchscreen display and input by a stylus pen.

5. The electronic device according to claim 1,
   wherein the second application program comprises a second memo writing application,
   wherein the first application program comprises a first memo writing application, and
   wherein the first user interface comprises substantially a black background.

6. The electronic device according to claim 1, wherein the instructions are configured to cause the processor to:
   analyze the one or more text strings to detect the portion of the one or more text strings disposed proximate to the category-implying indicatory; and
   select the first category from among the plurality of categories based on correlation of a name of the first category with the portion of the one or more text strings.

7. The electronic device according to claim 6, wherein the instructions are configured to cause the processor to, when a user input including a first divider for selecting a part of the memo content and the category-implying indicator is received, include and store the memo content in a category corresponding to the user input.

8. The electronic device according to claim 6, wherein the instructions are configured to cause the processor to, when a user input including a second divider for selecting another part of the memo content and the category-implying indicator is received, include and store the memo content in a category corresponding to the user input.

9. A control method of an electronic device, the method comprising:
   storing in a memory a plurality of categories into which data is sorted for storage;
   while executing, by a processor, a locked state of the electronic device, identifying occurrence of a first event;
   in response to identifying the occurrence of the first event, displaying a first user interface of a first application program on a touchscreen display of the electronic device while maintaining the locked state;
   receiving a user input including one or more text strings including a category-implying indicator and a memo content input through the first user interface;
   displaying, on the first user interface, the one or more text string and the memo content; and
   based in part on detecting the category-implying indicator, displaying, on the touchscreen display, a first category corresponding to at least a portion of the one or more text strings from among the plurality of categories,
   wherein the memo content is stored, in the memory, in association with the first category based in part on detecting the category-implying indicator.

10. The control method of the electronic device according to claim 9, further comprising identifying separating a stylus pen from the electronic device as the occurrence of the first event,
   wherein the user input includes an input detected on the touchscreen display and input by a stylus pen.

11. The control method of the electronic device according to claim 9, further comprising identifying sensing a signal from an external stylus pen as the occurrence of the first event.

12. The control method of the electronic device according to claim 9, further comprising:
- analyzing the one or more text strings to detect the portion of the one or more text strings disposed proximate to the category-implying indicator;
- selecting the first category from among the plurality of categories based on correlation of a name of the first category with the portion of the text string.

13. The control method of the electronic device according to claim 12, further comprising, when a user input including a first divider for selecting a part of the memo content and the category-implying indicator is received, including and storing the memo content in a category corresponding to the user input.

14. The control method of the electronic device according to claim 12, further comprising, when a user input including a second divider for selecting another part of the memo content and the category-implying indicator is received, including and storing the memo content in a category corresponding to the user input.

15. A computer program product comprising a non-transitory computer-readable recording medium storing instructions for executing, in a computer, the operations of:
- storing in a memory a plurality of categories into which data is sorted for storage;
- while executing, by a processor, a locked state of the computer, identifying occurrence of a first event;
- in response to identifying the occurrence of the first event, displaying a first user interface of a first application program on a touchscreen display of the electronic device while maintaining the locked state;
- receiving a user input including one or more text strings including a category-implying indicator and a memo content input through the first user interface; and
- displaying, on the first user interface, the one or more text string and the memo content; and
- based in part on detecting the category-implying indicator, displaying, on the touchscreen display, a first category corresponding to at least a portion of the one or more text strings from among the plurality of categories,
- wherein the memo content is stored, in the memory, in association with the first category based in part on detecting the category-implying indicator.

* * * * *